(12) United States Patent
Silva

(10) Patent No.: US 10,017,199 B2
(45) Date of Patent: Jul. 10, 2018

(54) BOARD HANDLING APPARATUS

(71) Applicant: Antonio Silva, Delray Beach, FL (US)

(72) Inventor: Antonio Silva, Delray Beach, FL (US)

(*) Notice: Subject to any disclaimer, the term of this patent is extended or adjusted under 35 U.S.C. 154(b) by 0 days.

(21) Appl. No.: 15/275,859

(22) Filed: Sep. 26, 2016

(65) Prior Publication Data

US 2017/0088155 A1    Mar. 30, 2017

Related U.S. Application Data

(60) Provisional application No. 62/234,238, filed on Sep. 29, 2015.

(51) Int. Cl.
*B62B 3/10* (2006.01)
*B62B 3/02* (2006.01)
*B62B 3/12* (2006.01)

(52) U.S. Cl.
CPC .............. *B62B 3/108* (2013.01); *B62B 3/02* (2013.01); *B62B 3/12* (2013.01); *B62B 2206/04* (2013.01); *B62B 2206/06* (2013.01); *B62B 2501/06* (2013.01)

(58) Field of Classification Search
CPC .. B62B 3/108; B62B 3/02; B62B 3/12; B62B 2206/04; B62B 2206/06
See application file for complete search history.

(56) References Cited

U.S. PATENT DOCUMENTS

| | | | | |
|---|---|---|---|---|
| 2,465,206 A | * | 3/1949 | Davis | E04F 21/1822 248/457 |
| 2,815,132 A | * | 12/1957 | Stone | B62B 3/04 182/141 |
| 2,828,870 A | * | 4/1958 | Corley | B66C 7/00 182/141 |
| 2,851,279 A | * | 9/1958 | Burg | B62B 3/108 280/43 |
| 3,305,219 A | * | 2/1967 | Rhodes | B66B 9/16 254/4 R |
| 3,382,988 A | * | 5/1968 | O'Reilly | E04F 21/1822 254/387 |
| 3,467,261 A | * | 9/1969 | Jewell | E04F 21/1822 185/37 |
| 3,643,935 A | * | 2/1972 | Bell | B25H 1/00 108/8 |
| 3,698,577 A | * | 10/1972 | Dean | B65G 49/062 280/79.3 |
| 3,822,023 A | * | 7/1974 | Cordel | B66F 7/0608 414/11 |
| 3,923,167 A | * | 12/1975 | Blankenbeckler | B25H 1/00 414/11 |
| 4,027,802 A | | 6/1977 | Reynolds | |
| 4,239,197 A | * | 12/1980 | Olstad | B23Q 1/525 269/152 |

(Continued)

*Primary Examiner* — Jacob B Meyer
(74) *Attorney, Agent, or Firm* — Laurence A. Greenberg; Werner H. Stemer; Ralph E. Locher

(57) ABSTRACT

A board handling apparatus transports heavy sheets of plywood, particle board, chipboard, blackboard, plastic, hardboard, acrylic, granite and the like. The board handling apparatus has a base, three wheels extending from the base, an adjustable height column extending up from the base, and an adjustable length arm extending from the adjustable height column. The adjustable length arm has an arm base for receiving a heavy sheet to be transported.

16 Claims, 9 Drawing Sheets

(56) References Cited

U.S. PATENT DOCUMENTS

| | | | | |
|---|---|---|---|---|
| 4,339,219 A * | 7/1982 | Lay | | E04F 21/1822 254/4 C |
| 4,600,348 A * | 7/1986 | Pettit | | E04F 21/1822 254/3 C |
| 4,676,713 A | 6/1987 | Voelpel | | |
| 5,078,364 A | 1/1992 | Harrell | | |
| 5,224,808 A * | 7/1993 | Macris | | B66F 19/00 414/11 |
| 5,400,720 A * | 3/1995 | Stevens | | A47B 9/16 108/147 |
| 5,460,469 A * | 10/1995 | Young | | B66C 23/48 254/4 C |
| 5,640,826 A * | 6/1997 | Hurilla, Jr. | | E04F 21/1805 414/11 |
| 5,700,123 A * | 12/1997 | Rokosh | | E04F 21/1811 414/11 |
| 5,984,605 A * | 11/1999 | Young | | E04G 21/16 414/11 |
| 6,010,299 A * | 1/2000 | Jesswein | | B66F 5/00 254/8 R |
| 6,032,966 A * | 3/2000 | Young | | B62B 3/108 280/47.34 |
| 6,244,810 B1 * | 6/2001 | Reyes | | E04F 21/1811 254/4 C |
| 6,341,788 B1 * | 1/2002 | Ciccone | | B25H 1/00 280/47.28 |
| 6,857,836 B2 * | 2/2005 | Keller | | B62B 3/022 269/905 |
| 7,014,413 B2 * | 3/2006 | Young | | B62B 3/108 269/905 |
| 7,048,258 B1 * | 5/2006 | Dromgool | | B62B 3/108 254/332 |
| 7,188,843 B2 * | 3/2007 | Magness | | B25H 5/00 280/30 |
| 7,341,006 B2 * | 3/2008 | Hernandez | | A47B 3/0815 108/115 |
| 7,419,170 B2 | 9/2008 | Krizan et al. | | |
| 7,484,594 B1 * | 2/2009 | Feliciano, Jr. | | B62B 1/262 182/127 |
| 7,494,312 B2 * | 2/2009 | Valette | | E04F 21/1822 280/79.7 |
| 7,708,250 B1 * | 5/2010 | Dein | | E04F 21/1811 248/125.2 |
| 7,828,506 B1 | 11/2010 | Young | | |
| 8,104,787 B2 * | 1/2012 | Haley | | B62B 3/108 108/115 |
| 8,313,113 B2 * | 11/2012 | Ryan | | B62B 1/004 280/33.991 |
| 8,348,287 B1 * | 1/2013 | Smith | | B62B 3/04 280/47.34 |
| 8,528,919 B2 * | 9/2013 | Webster | | B62B 3/008 280/651 |
| 8,695,997 B1 * | 4/2014 | Martinez | | B62B 3/002 280/47.34 |
| 8,708,350 B2 * | 4/2014 | Bottazzi | | B62B 1/002 280/35 |
| 8,967,633 B2 * | 3/2015 | Drowanowski | | B62B 1/26 280/47.18 |
| 9,004,509 B2 * | 4/2015 | Smith | | B62B 3/108 280/651 |
| 9,381,930 B2 * | 7/2016 | Septimio | | B62B 3/02 |
| 2003/0127834 A1 * | 7/2003 | Click | | B62B 3/108 280/651 |
| 2008/0008561 A1 * | 1/2008 | Hontz, Jr. | | E04F 21/1822 414/11 |
| 2008/0008581 A1 | 1/2008 | Hontz, Jr. | | |
| 2008/0235871 A1 * | 10/2008 | York | | B62B 3/108 5/510 |
| 2009/0152224 A1 * | 6/2009 | Hsieh | | B25H 1/00 211/170 |
| 2015/0259003 A1 * | 9/2015 | Septimio | | B62B 3/02 280/47.18 |
| 2017/0029003 A1 * | 2/2017 | Crowley | | B62B 3/0612 |
| 2017/0044782 A1 * | 2/2017 | Carlei | | B66F 9/181 |
| 2017/0088155 A1 * | 3/2017 | Silva | | B62B 3/108 |

\* cited by examiner

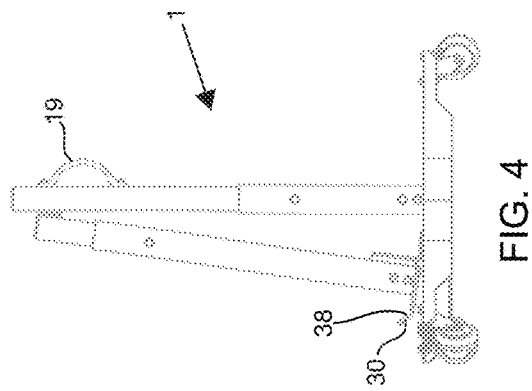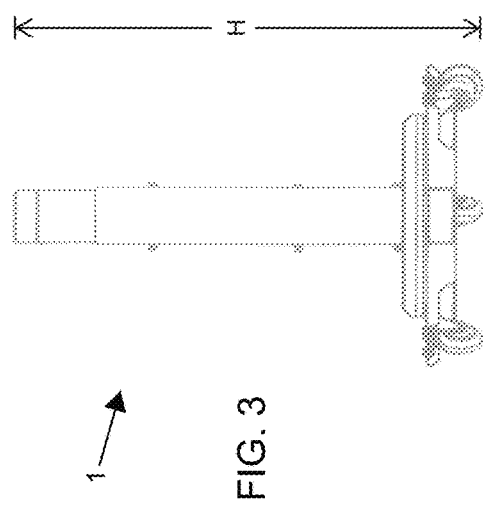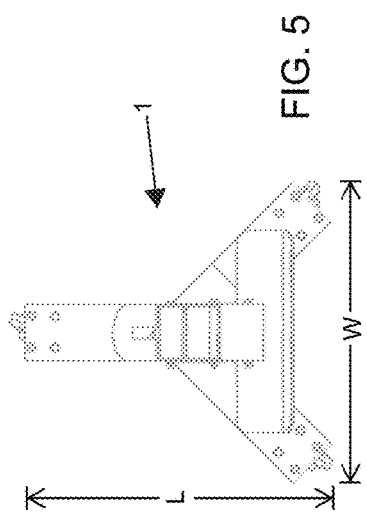

BOARD HANDLING APPARATUS

CROSS-REFERENCE TO RELATED APPLICATION

This application claims the priority, under 35 U.S.C. § 119, of U.S. provisional application No. 62/234,238, filed Sep. 29, 2015; the prior application is herewith incorporated by reference in its entirety.

BACKGROUND OF THE INVENTION

Field of the Invention

The invention relates to a board handling apparatus that assists in transporting boards such as 4×8 sheets of plywood, MDF, particle board, chipboard, blackboard, plastic, hardboard, OSB, stirling board, melamine, MDO, acrylic, granite and similar products. More specifically the board handling apparatus is configured to extent the working life of master craftsmen in their late years of the trade and to continuously prevent injuries in workmen in their early years of the trade.

Carpentry is one of the oldest skilled trades that is still used to this day and, despite growth in automation, furniture manufacturing remains labor-intensive. Injury rates for the industry in the U.S. are about 50 percent higher than the national average due to the hazards of operating equipment and handling heavy products. These injuries can disable master craftsmen and cause high replacement training related expenses.

U.S. Pat. No. 3,305,219 to Rhodes teaches a building board or dry wall handler and lifter. The handler and lifter taught in Rhodes has large dimensions being both extremely wide and tall and has a complex lifting mechanism. Thus the Rhodes taught invention is expensive to manufacture, complicated in design and has a large footprint.

U.S. Pat. No. 2,815,132 to Stone teaches another board handling and lifting apparatus. Stone teaches a more compact configuration than Rhodes however, Stone teaches an even more complex lifting device and thus is expensive to manufacture and is subject to failure in its lifting mechanism due to the complex design.

There is a need in the industry for a board handling tool that is compact and thus easy to store and less expensive to manufacture. In addition, the majority of the cost in manufacturing the known prior art board handling apparatuses relates to the incorporation of the board lifting device. Therefore there is a need for a simple board lifting mechanism which is inexpensive to manufacture, robust, simple to operate and has a high reliability rate.

SUMMARY OF THE INVENTION

It is accordingly an object of the invention to provide a board handling apparatus that overcomes the above-mentioned disadvantages of the prior art devices of this general type which is robust, inexpensive, simple to assembly and has a small footprint.

With the foregoing and other objects in view there is provided, in accordance with the invention, a board handling apparatus. The board handling apparatus has a base, three wheels extending from the base, an adjustable height column extending up from the base, and an adjustable length arm extending from the adjustable height column. The adjustable length arm has an arm base for receiving a product to be transported. The base having a three wheel configuration allows the board handling apparatus to have a compact design, carry a great weight and yet be easy to maneuver.

In accordance with an added feature of the invention, the adjustable length arm is attached to the adjustable height column in a pivotable manner.

In accordance with another feature of the invention, there is provided a hinge for connecting the adjustable length arm to the adjustable height column. Because a simply hinge is used as the complete board raising assembly, an inexpensive and robust designed is provided. In addition, a hinge allows for use of the principle of leverage for raising and lowering a board.

In accordance with an additional feature of the invention, the adjustable height column has a fixed column fixed to the base and an adjustable column sliding within or over the fixed column for setting a height of the adjustable height column. In this manner, the board handling device can be easily adjusted to carry various sized boards.

In accordance with yet another feature of the invention, a handle is attached to the adjustable column. The handle is used for pushing and pulling around the board handling apparatus.

In accordance with a further feature of the invention, the base has a main column support and the fixed column fastens to the main column support.

In accordance with an added feature of the invention, the adjustable length arm has a fixed arm and an adjustable arm that slides within or over the fixed arm for setting a length of the adjustable length arm. The arm base of the adjustable length arm is rectangular in shape with at least one corner being shaped with an oblique angle. Preferably, the arm base has a longitudinal side with a bent lip for securing the product to be transported. In addition to the height of the board handling apparatus, the length of the arm can also be adjusted which helps in setting the right leverage play for raising and lowering a board.

In accordance with another additional feature of the invention, the fixed arm and the adjustable arm of the adjustable length arm have a rectangular shape.

In accordance with a further added feature of the invention, the base has three base arms including a central arm and two side arms connected to the central arm. Each of the side arms has a first end with a wheel receiving recess and an oblique second end for connecting to the central arm.

In accordance with yet a further feature of the invention, the adjustable column of the adjustable height column has at least one recess and the adjustable length arm has a locking bar for engaging in the at least one recess for fixing the adjustable length arm in the raised position.

In accordance with another added feature of the invention, stoppers are provided for covering ends of at least one of the base, the adjustable height column, and the adjustable length arm.

With the foregoing and other objects in view there is provided, in accordance with the invention, a board handling apparatus. The board handling apparatus contains a cross-beam and two board handling tools connected to each other by the cross-beam. Each of the board handling tools includes a base, three wheels extending from the base, an adjustable height column extending up from the base, and an adjustable length arm extending from the adjustable height column. The adjustable length arm has an arm base for receiving a product to be transported.

Other features which are considered as characteristic for the invention are set forth in the appended claims.

Although the invention is illustrated and described herein as embodied in a board handling apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a front view of the board handling apparatus;

FIG. 4 is a side view of the board handling apparatus;

FIG. 5 is a top plan view of the board handling apparatus;

DETAILED DESCRIPTION OF THE INVENTION

Figure 1:
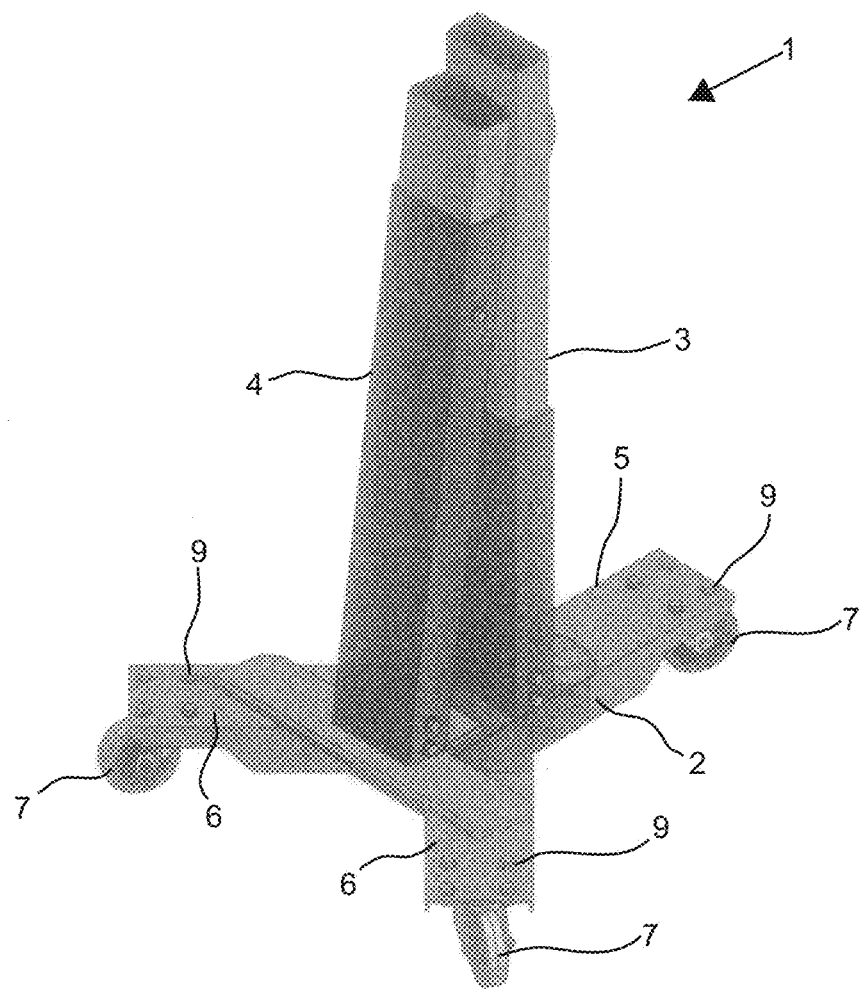
FIG. 1 is a diagrammatic perspective view of a board handling apparatus according to the invention.

In all the figures of the drawing, sub-features and integral parts that correspond to one another bear the same reference symbol in each case. Referring now to the figures of the drawings in detail and first, particularly to FIGS. 1 and 2 thereof, there is shown a board handling apparatus 1 having a base 2, a main column 3 and an arm assembly 4.

Figure 2:
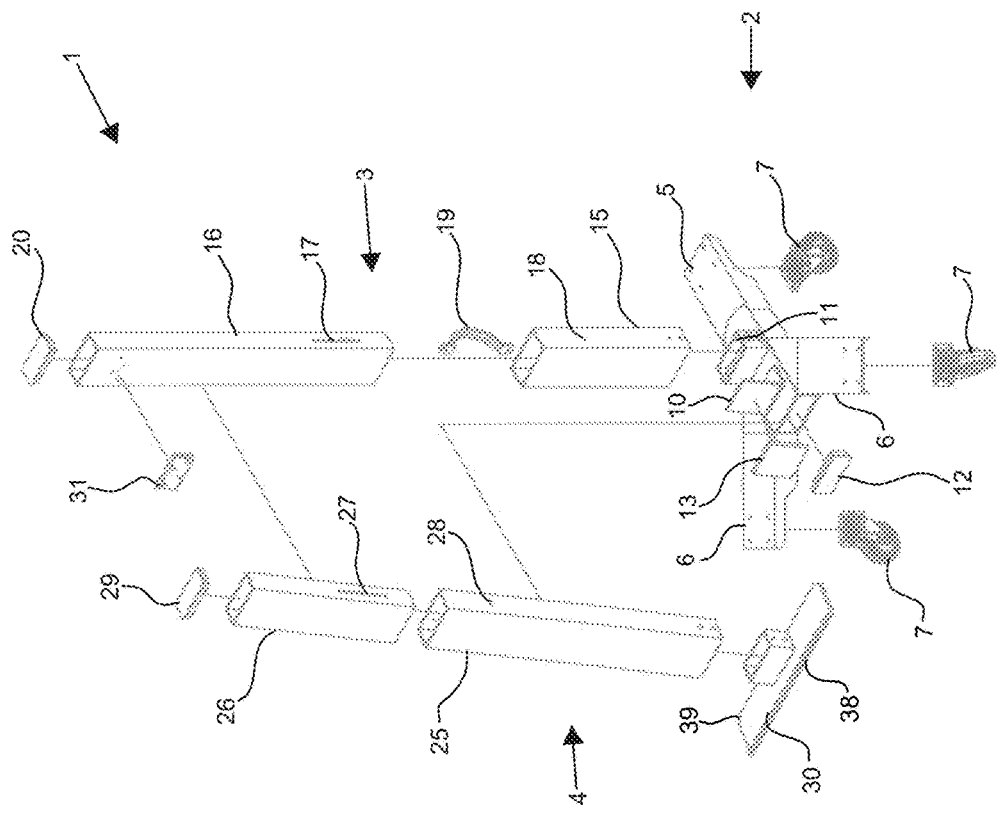
FIG. 2 is an exploded, perspective view of the board handling apparatus.
Figure 6:
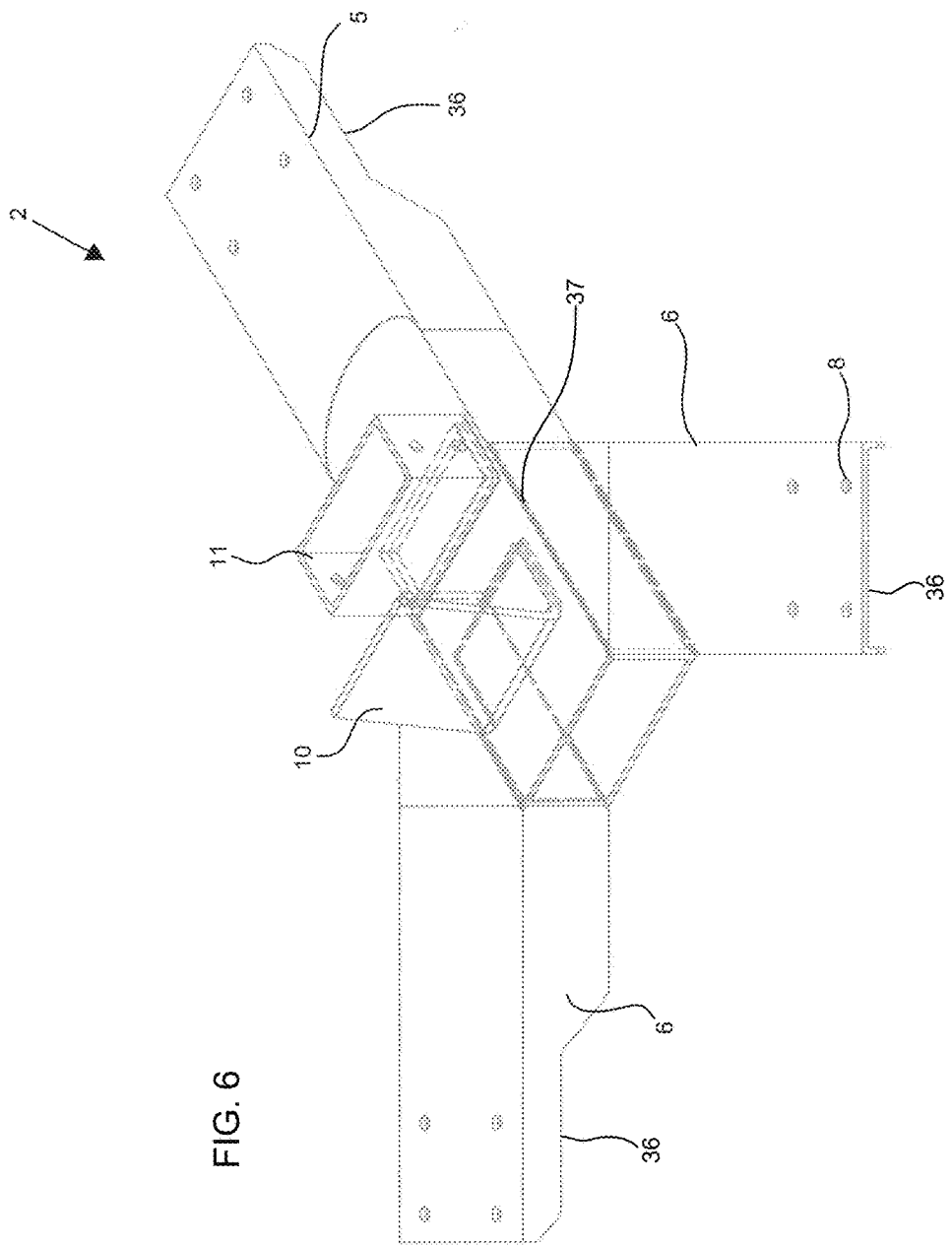
FIG. 6 is perspective view of a base of the board handling apparatus without caster wheels.

As best shown in FIGS. 2 and 6, the base 2 is formed of three base arms 5, 6 attached to each other (e.g. welded, bolted, riveted, screwed and/or adhesive). The base arms 5, 6 include a central arm 5 and two side arms 6 attached to the central base arm 5. The central arm 5 is generally of rectangular shape and has a caster wheel receiving recess 36. Each of the side arms 5 have a first end with the caster wheel receiving recess 36 and an oblique second end 37 for attaching to the central arm 5. One caster wheel 7 extends from each of the base arms 5, 6 in the area of the caster wheel receiving recess 36. Each of the base arms 5, 6 has openings 8 for receiving fasteners 9 for attaching the caster wheels 7 to the respective arms 5, 6. The base 2 further has an arm stopper 10 with a shock absorbing rubber or plastic cap 13 and a main column support 11 (see FIG. 2). An end of the central base arm 5 is covered by a stopper 12 such as a rubber or plastic stopper 12.

The main column 3 is an adjustable height column 3 where a height of the column is adjustable. The main column 3 is secured to the main column support 11 of the base 2. The main column 3 is formed of a fixed column 15 and an adjustable column 16. The adjustable column 16 slides within the fixed column 15 and has a plurality of holes 17 that align with a hole 18 on the fixed column 15 and are fixed to each with fasteners. In this manner, a height of the adjustable column 16 is variable within the fixed column 15. The height of the adjustable column 16 is set in dependence on the type of materials to be transported and the dimensions of the materials to be transported. Alternatively, the adjustable column 16 could slide over the fixed column 15 rather than inside of it. The adjustable column 16 is fixed to the fixed column 15 by a fastener such as a bolt but ideally by a quick release bolt so that adjustments can be quickly carried out.

A handle 19 is attached to the adjustable column 16 and is used for maneuvering the board handling apparatus 1. A plastic cap 20 covers a top of the adjustable column 16.

The arm assembly 4 is formed of a fixed arm 25 and an adjustable arm 26 that slides within the fixed arm 25. The adjustable arm 26 has a plurality of vertically aligned holes 27 which are aligned with a hole 28 in the fixed arm 24 and are fixed to each other with fasteners, ideally quick release fasteners. In this manner, a length of the arm assembly 4 is adjustable by aligning the selected hole 27 of the adjustable arm 26 with the hole 28 of the fixed arm 25. It is noted that the length of the adjustable arm 26 is set in dependence on the height and weight of the board being transported.

Figure 7:
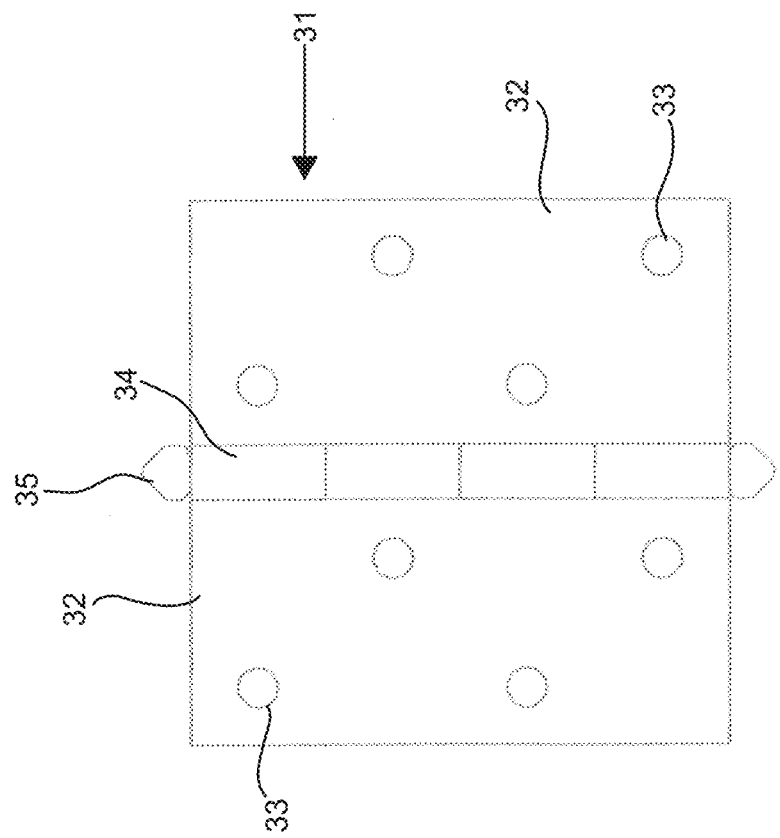
FIG. 7 is a top view of a hinge.

A top of the adjustable arm is covered by a plastic cap 29. Attached to the fixed arm 25 is an arm base 30 that is configured for holding a sheet board. A front side 38 of the base 30 is bent upwards and assists in securing the sheet board against the arm assembly 4 (see FIG. 4). The back side 39 of the base 30 has corners which have an oblique shape. The arm assembly 4 is attached to the main column 3 by a simple hinge 31. FIG. 7 shows an enlarged view of the hinge 31 which has two hinge plates 32 with holes 33, a knuckle 34 and a pin 35 inserted in the knuckle 34.

FIG. 3 is a front view of the board handling apparatus 1 which ideally in its most compact form has a height H of approximately 33 inches and is adjustable upwards in one inch intervals up to 41 inches or more. Of course the interval distance between the holes 17, 27 could be ½, ¾, 1¼, 1½, 2 inches or more. In addition the number of holes can be 2, 3, 4, 5, 6, 7, 8, 9, 10, 11, 12 or more depending on the need for adjustability.

Ideally, all the inner holes 17, 27 are threaded and a simple bolt can be used for fastening all of the components together. More ideally, a quick release fastener is provided for faster height adjustments.

FIG. 4 is a side view of the board handling apparatus 1 showing the position of the handle 19 which is located in an easy to grab position and the bent up orientation of the base 30.

FIG. 5 shows a top view of the board handling apparatus 1 which has a compact configuration due to a stable three wheeled design. Thus, larger four wheel designs can be dispensed with. The board handling apparatus 1 has a length L of approximately 22 inches and a width of less than 20 inches. Off course the board handling apparatus 1 could be easily enlarged as necessary (e.g. to handle larger and heavier boards).

Figure 8:
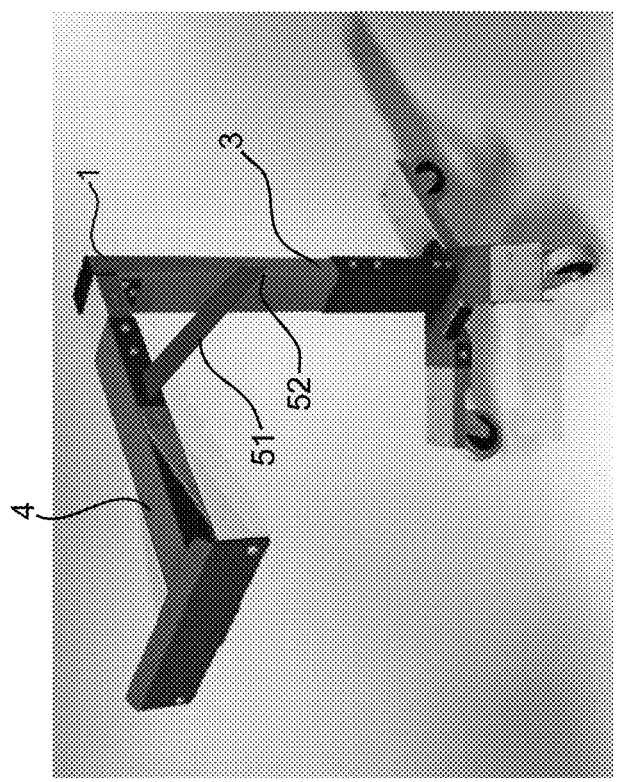
FIG. 8 is a perspective view of the board handling apparatus with an arm assembly in a raised position.

FIG. 8 shows the arm assembly 4 in a raised position. In the raised position a board is easily slid off the board handling apparatus 1 onto a worktable. FIG. 8 shows an additional feature that has been added to the arm assembly 4. The arm assembly 4 has an arm locking assembly 51. The arm locking assembly 51 locks the assembly arm 4 in the raised position by engaging into a recess 52 formed in the main column 3 or locks to a side of the main column 3.

Figure 9:
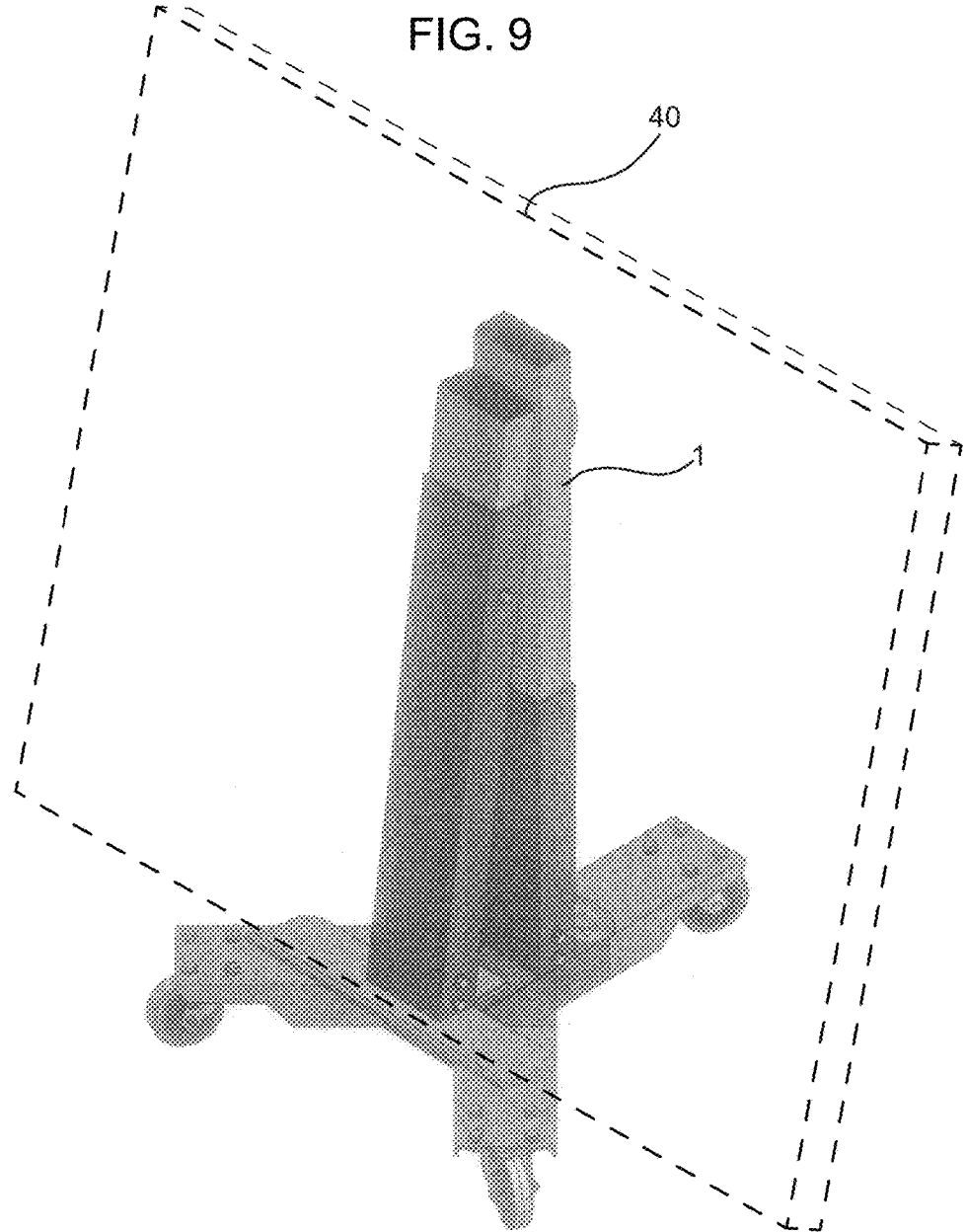
FIG. 9 is a perspective view of the board handling apparatus in a transport position carrying a board.

FIG. 9 shows the boarding handling apparatus 1 carrying a board 40 with the arm assembly 4 in a transport position.

Figure 10:
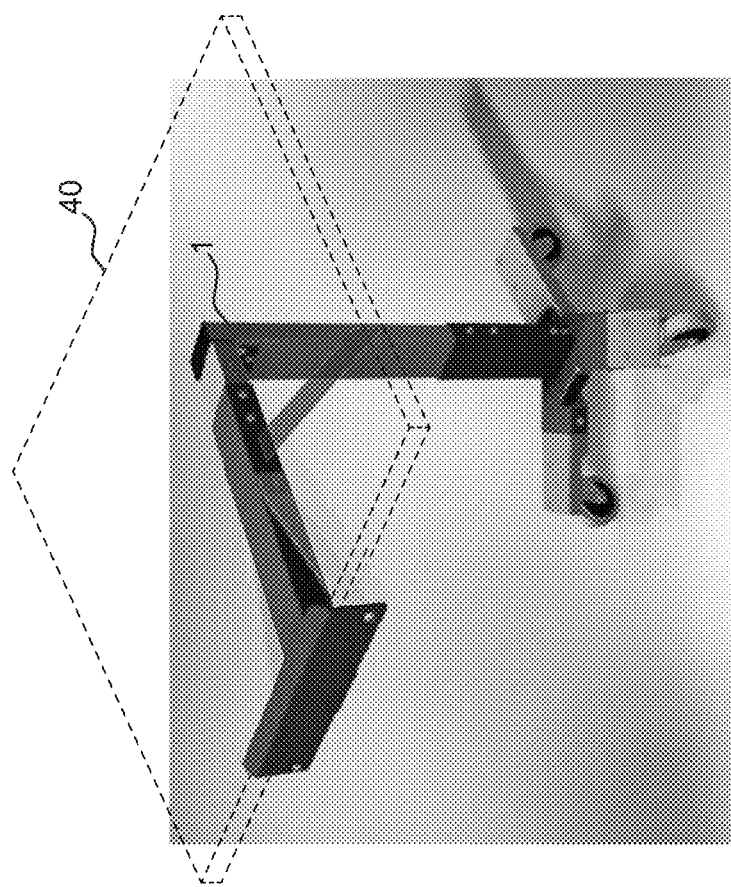
FIG. 10 is a perspective view of the board handling apparatus in the raised position where the board is positioned for removal.

FIG. 10 shows the board handling apparatus 1 with the board 40 tilted to the raised position. As the height of the boarding handling apparatus 1 is fairly low, the board 40 is merely tilted from the transport position to the raised position about an axis of rotation of the hinge 31. The arm assembly 4 functions as a lever and relies on the weight of the board 40 for assisting in the pivoting of the board 40 from the transport position to the raised position. In this manner, little force must be provided by the craftsman to move the board from the transport position to the raised position. Because of the lever function, a simple, inexpensive but robust hinge 31 can be used instead of the complicated raising mechanism used in the prior art.

The board handling apparatus 1 carries the sheet board 40 from a horizontal or vertical position onto a horizontal or vertical position at a higher or lower workspace assisting the worker to handle boards at the worksite. The worker positions the arm assembly 4 and loads the product 40, lowers the arm assembly if needed, easily pushes the board handling apparatus 1 to the workspace desired and then effortlessly pulls the arm assembly 4 up, if needed, while placing the product where desired. The board handling apparatus 1 releases the product 40 as it is horizontally laid flat or the worker unloads the product if the desired position is vertical.

Figure 11:
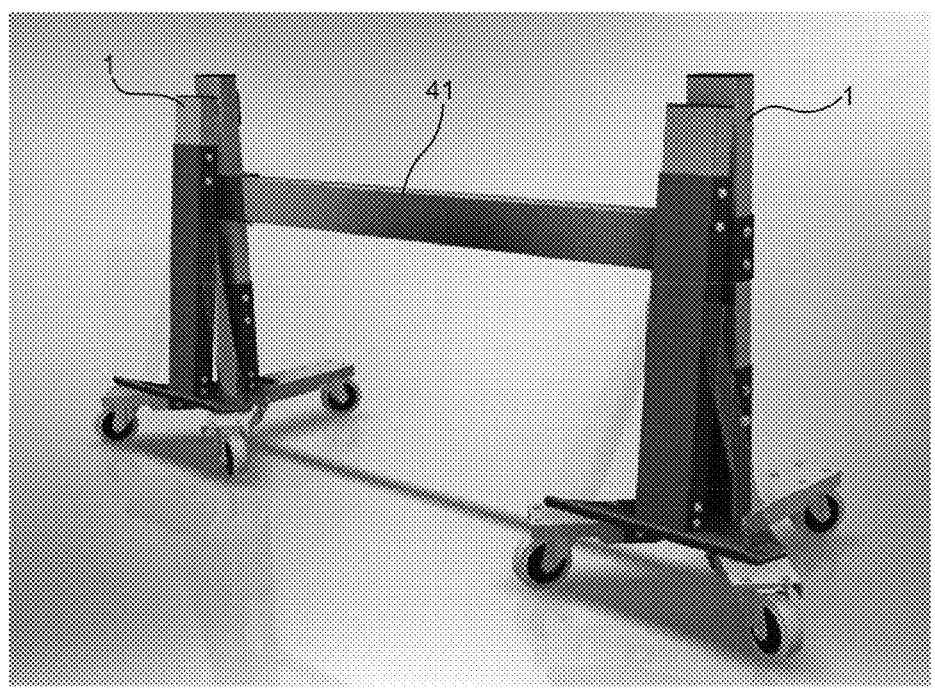
FIG. 11 shows a perspective view of two boarding handling apparatuses connected together.

For extremely heavy or long products (e.g. granite sheet), two board handling apparatuses 1 can use spaced apart and optionally connected to each other with a connecting crossbeam 41 (see FIG. 11). Such a configuration is necessary to handle heavier products such as slabs of granite, quartz, corian, marble and similar products. Please note that without the crossbeam, three or more board handling apparatuses 1 can be used.

All of the main components 2, 3, 4 are ideally made from aluminum, steel, composites or plastics. Of course other suitable metal combinations are possible.

The invention claimed is:

1. A board handling apparatus, comprising:
   a base having three base arms including a central arm and two side arms connected to said central arm, each of said side arms having a first end with a wheel receiving recess formed therein and an oblique second end for connecting to said central arm;
   three wheels extending from said base, said three wheels include a first wheel, a second wheel and a third wheel, said first and second wheels being disposed along a common line, said third wheel is disposed between said first and second wheels offset from said common line;
   an adjustable height column extending up from said base; and
   an adjustable length arm extending from said adjustable height column, said adjustable length arm having an arm base for receiving a product to be transported.

2. The board handling apparatus according to claim 1, wherein said adjustable length arm is attached to said adjustable height column in a pivotable manner.

3. The board handling apparatus according to claim 1, further comprising a hinge connecting said adjustable length arm to said adjustable height column.

4. The board handling apparatus according to claim 1, wherein said adjustable height column has a fixed column fixed to said base and an adjustable column sliding within or over said fixed column for setting a height of said adjustable height column.

5. The board handling apparatus according to claim 4, further comprising a handle attached to said adjustable column, said handle being used for pushing and pulling around the board handling apparatus.

6. The board handling apparatus according to claim 4, wherein said base has a main column support and said fixed column of said adjustable height column fastens to said main column support.

7. The board handling apparatus according to claim 1, wherein said adjustable length arm has a fixed arm and an adjustable arm that slides within or over said fixed arm for setting a length of said adjustable length arm.

8. The board handling apparatus according to claim 7, wherein said arm base of said adjustable length arm is generally rectangular in shape with one side being obliquely angled.

9. The board handling apparatus according to claim 8, wherein said arm base has a longitudinal side with a bent lip for securing the product to be transported.

10. The board handling apparatus according to claim 7, wherein said fixed arm and said adjustable arm of said adjustable length arm have a rectangular shape.

11. The board handling apparatus according to claim 4, wherein said adjustable length arm has an arm locking assembly for fixing the adjustable length arm in a raised position.

12. The board handling apparatus according to claim 1, wherein said base, said adjustable height column, and said adjustable length arm are made from at least one material selected from the group consisting of aluminum, steel, composite and plastic.

13. The board handling apparatus according to claim 1, further comprising stoppers for covering ends of at least one of said base, said adjustable height column, and said adjustable length arm.

14. The board handling apparatus according to claim 1, wherein said arm base has a given length being less than a spacing between said first and second wheels.

15. The board handling apparatus according to claim 1, wherein the board handling apparatus has no more wheels than said three wheels.

16. The board handling apparatus according to claim 1, wherein:
   said adjustable length arm is a single adjustable length arm; and
   said adjustable height column is a single adjustable height column.

* * * * *